United States Patent
Marlin et al.

(10) Patent No.: US 9,102,037 B2
(45) Date of Patent: Aug. 11, 2015

(54) ABRASIVE MOLTEN GRAINS

(75) Inventors: Samuel Marlin, Plan D'orgon (FR); Sylvain Petigny, Velleron (FR)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 356 days.

(21) Appl. No.: 13/121,835

(22) PCT Filed: Oct. 9, 2009

(86) PCT No.: PCT/IB2009/054444
§ 371 (c)(1),
(2), (4) Date: May 4, 2011

(87) PCT Pub. No.: WO2010/041223
PCT Pub. Date: Apr. 15, 2010

(65) Prior Publication Data
US 2011/0203188 A1    Aug. 25, 2011

(30) Foreign Application Priority Data

Oct. 9, 2008 (FR) ..................... 08 56835

(51) Int. Cl.
*B24C 11/00* (2006.01)
*B24D 3/00* (2006.01)
*C09G 1/02* (2006.01)
*C09K 3/14* (2006.01)

(52) U.S. Cl.
CPC . *B24C 11/00* (2013.01); *B24D 3/00* (2013.01); *C09G 1/02* (2013.01); *C09K 3/1409* (2013.01); *C09K 3/1436* (2013.01); *Y10T 428/2982* (2015.01)

(58) Field of Classification Search
CPC .. C04B 35/111; C04B 35/0435; C04B 35/05; C04B 35/106; B24C 11/00; B24D 3/00; C09G 1/02; C09K 3/1409; C09K 3/1436
USPC .......................................................... 51/309
See application file for complete search history.

(56) References Cited

U.S. PATENT DOCUMENTS

| | | | |
|---|---|---|---|
| 3,181,939 A | 5/1965 | Marshall et al. | |
| 3,891,408 A | 6/1975 | Rowse et al. | |
| 3,993,114 A | 11/1976 | Scott | |
| 4,126,429 A | 11/1978 | Watson | |
| 2004/0040218 A1* | 3/2004 | Aleonard et al. | 51/309 |

FOREIGN PATENT DOCUMENTS

| EP | 0 011 583 A1 | 5/1980 |
|---|---|---|
| JP | H-08-502304 | 3/1996 |
| WO | WO 94/07969 | 4/1994 |
| WO | WO 2004/094554 A1 | 11/2004 |

OTHER PUBLICATIONS

International Search Report in International Application No. PCT/IB2009/054444; dated Jan. 19, 2010 (with English-language translation).
Japanese Office Action dated Oct. 31, 2013 issued in Japanese Patent Application No. 2011-530622 (with translation).

* cited by examiner

*Primary Examiner* — Shuangyi Abu Ali
(74) *Attorney, Agent, or Firm* — Oliff PLC

(57) ABSTRACT

The invention relates to molten grains having the following chemical composition in wt % in terms of oxides: $Al_2O_3$: balance to 100%; $ZrO_2+HfO_2$: 16-24%; MgO in an amount such that the weight ratio $(ZrO_2+HfO_2)/MgO$ is between 25 and 65; other species: 0-2%. The grains can be used as abrasive grains.

10 Claims, No Drawings

ABRASIVE MOLTEN GRAINS

TECHNICAL FIELD

The present invention relates to fused grains containing magnesium oxide. The invention also relates to an abrasive tool comprising grains in accordance with the invention and to a method for manufacturing grains according to the invention.

PRIOR ART

Abrasive tools are generally classified according to the method in which the ceramic grains constituting them are formed: free abrasives, used in spraying or in suspension, without a support; coated abrasives where the grains are attached to a support of the fabric, paper or polymer film type; and bonded abrasives in the form of circular grinding wheels, sticks, etc.

In the case of bonded abrasives, the abrasive grains are pressed with an organic binder, for example a phenolic resin, or a glassy binder, for example with a binder consisting of oxides, in particular a silicate-containing binder. These grains must themselves have good abrasion mechanical properties, especially good toughness and/or hardness, and provide good cohesion with the binder (strength of the interface).

At the present time, there are various families of abrasive grains that allow a wide range of applications and performance to be covered. In the family of alumina grains, the following are in particular distinguished, as a function of the application: electrocast alumina grains (corundums), electrocast alumina-zirconia grains and alumina grains manufactured by the sol-gel method.

The grains synthesized by melting raw materials, referred to as "fused grains", offer an excellent quality/manufacturing cost compromise.

Within the range of fused grains, materials based on alumina and zirconia are known from U.S. Pat. No. 3,181,939. These grains are generally composed of 10 to 60% of zirconia, 0 to 10% of an additive, the balance being alumina. In practice, the zirconia content of commercial products lies either at around 25%, or at around the value of the alumina/zirconia eutectic located at about 42% zirconia, generally between 35 and 50%, as described in U.S. Pat. No. 3,891,408.

Known from EP 1 613 709 are grains containing from 2.2% to 6.5% magnesium oxide, the balance being $Al_2O_3$. These aluminous grains are manufactured by melting raw materials. The molten liquid is then cooled, preferably rapidly, in order to favor the formation of fine oriented structures, for example by means of a device for casting between thin metal plates such as that presented in U.S. Pat. No. 3,993,119. The cooled material is finally milled, for example by means of roll mills, and then screened and classified as a series of grit size distributions, or "grits", corresponding to precise standards, for example the FEPA standard.

U.S. Pat. No. 4,126,429 describes abrasive fused grains based on alumina and on zirconia comprising between 1 and 2% of MgO. The zirconia content is between 22% and 28% and U.S. Pat. No. 4,126,429 explains that the performance of the grains drops as soon as the zirconia content is below 22%. The optimal percentage of zirconia being considered to lie in the vicinity of 25%.

An abrasive fused grain must have a compromise between hardness and impact strength and fracture strength which is suitable for the application in which it is used. Specifically, this compromise depends on the materials abraded and the abrasion conditions.

The hardness corresponds to the ability of the grain to penetrate into the abraded material whilst the impact and fracture strength determines the regeneration, by microfracturation, of the abrasive surfaces of the grain.

There is therefore a permanent need for abrasive grains that are more competitive and offer new compromises between the hardness on the one hand and the impact and fracture strength on the other hand. One objective of the invention is to meet this need.

SUMMARY OF THE INVENTION

The present invention relates to fused grains having the following chemical analysis, as percentages by weight on the basis of the oxides:
  $Al_2O_3$: balance to 100%
  $ZrO_2+HfO_2$: 16-24%;
  MgO in an amount such that the $(ZrO_2+HfO_2)$/MgO weight ratio is between 25 and 65;
  other species: 0-2%.

As will be seen in greater detail in the remainder of the description, the grains according to the invention simultaneously have good impact and fracture strength and good hardness.

The fused grains according to the invention may also have one or more of the following features:
  The content of $ZrO_2+HfO_2$ is preferably greater than 17.0% by weight, preferably greater than 18.0% and/or less than 23.0%, preferably less than 22.5%. In one embodiment where the manufacturing cost is an important parameter, the content of $ZrO_2+HfO_2$ is preferably less than 22.0%, preferably less than 20.0%.
  The $(ZrO_2+HfO_2)$/MgO weight ratio is preferably greater than 28, preferably greater than 30, more preferably greater than 35, or even greater than 40 and/or less than 60, less than 55, less than 50, or even less than 47.
  The content of magnesium oxide is preferably greater than 0.35%, preferably greater than 0.40%, and/or less than 0.95%, less than 0.90%, less than 0.85%, less than 0.80%, preferably less than 0.70%, more preferably less than 0.60%.
  The total content of "other species" is preferably less than 1%, or even less than 0.5%, or even less than 0.4%. Preferably, the other species are only impurities. Preferably, the content of each of the impurities is less than 0.1%. In particular, preferably, $Na_2O<0.1\%$, or even $Na_2O<0.05\%$. Also preferably, the contents of $SiO_2$, CaO, $TiO_2$, $Fe_2O_3$ or of $Cr_2O_3$ are each less than 0.5%, preferably less than 0.3%. Still preferably, the residual carbon is less than 1500 ppm, less than 1300 ppm, or even less than 800 ppm.
  Preferably, the size of the grains is greater than 150 μm, and/or less than 3.35 mm, or less than 2 mm.

The fused grains according to the invention may be in the form of a mixture of grains, especially in the form of a mixture of grains ready to be used as raw material for the manufacture of an abrasive tool, or in a form where these grains are immobilized with respect to one another, for example because they are attached to a fabric or bound together in order to form a rigid mass, in particular to form a bonded abrasive.

Such a mixture of grains may also act as an abrasive medium, in particular in a sanding application, or in an application where this mixture is sprayed onto a part to be cleaned or stripped.

The invention thus also relates to a mixture of grains comprising, or even constituted of, grains according to the invention.

The invention also relates to an abrasive tool comprising grains bound by a binder and bonded, for example in the form of a grinding wheel, or deposited on a support, for example deposited as a layer on a flexible support, this tool being noteworthy in that at least one portion, or even all, of said grains are in accordance with the invention.

The abrasive tool may be, in particular, a truing grinding wheel, a precision grinding wheel, a sharpening grinding wheel, a cut-off grinding wheel, a creep feed grinding wheel, a fettling or roughing grinding wheel, a regulating grinding wheel, a portable grinding wheel, a foundry grinding wheel, a drill grinding wheel, a mounted grinding wheel, a cylinder grinding wheel, a cone grinding wheel, a disk grinding wheel or a segmented grinding wheel or any other type of grinding wheel.

The invention finally relates to a method for manufacturing grains according to the invention, comprising the following successive steps:
a) mixing of raw materials;
b) melting of said mixed raw materials until a molten liquid is obtained;
c) cooling of said molten liquid by quenching it, preferably so that the molten liquid is entirely solidified in less than 3 minutes, until a solid mass is obtained; and
d) milling of said solid mass so as to obtain a mixture of grains and, optionally, grit size classification of said mixture, said raw materials being chosen so that the grains of said mixture have a chemical composition in accordance with that of the grains according to the invention.

Definitions

The expression "fused grain" is understood to mean a grain obtained following a method comprising a solidification, by cooling, of a molten liquid.

A "molten liquid" is a liquid mass which, in order to retain its shape, must be kept in a container. It may contain a few solid particles, but in an insufficient amount for them to be able to structure said mass.

The expression "mixture of grains" is understood to mean a flowable mixture of grains, that is to say that does not have intrinsic rigidity. For grains of small size, the term "powder" is conventionally used.

Conventionally, the "size" of a grain corresponds to the minimum standard mesh size through which said grain can pass.

When reference is made to grits or to the FEPA-F standard, reference is made to the FEPA-F Standard 42 GB-1984.

The oxide contents of the grains relate to the overall contents for each of the corresponding chemical elements, expressed in the form of the most stable oxide, according to the standard convention in the industry. Therefore, included are suboxides and optionally nitrides, oxynitrides, carbides, oxycarbides, carbonitrides, or even metallic species of the aforementioned elements.

When a chemical composition of a fused grain is described, "other species" denotes all the compounds that are not mentioned explicitly elsewhere, and in particular the impurities.

The term "impurities" is understood to mean the inevitable constituents introduced involuntarily and necessarily with the raw materials or resulting from reactions with these constituents. The impurities are not required constituents, but only constituents that are tolerated. For example, the compounds forming part of the group of oxides, nitrides, oxynitrides, carbides, oxycarbides, carbonitrides and metallic species of sodium and other alkali metals, iron, vanadium and chromium are impurities. Hafnium oxide, naturally present in the zirconia sources at contents of less than 2%, is not considered to be an impurity when the desired product must comprise zirconia or zirconia and hafnium oxide.

The expression "$ZrO_2+HfO_2$" is understood to mean a mixture of zirconia and hafnium oxide in which the amount of hafnium oxide corresponds to the hafnium oxide naturally present in the source of zirconia.

The "traces" correspond to amounts of less than 5% by weight of the phases present.

In the present description and claims, unless otherwise mentioned, all the compositions of a grain are given as percentages by weight, on the basis of the oxides of the grain.

Other features and advantages of the present invention will appear on reading the detailed description which follows.

DETAILED DESCRIPTION

The fused grains according to the invention may be manufactured according to any conventional method for manufacturing fused grains of alumina or alumina-zirconia, in particular by means of a short-arc furnace, with a fusion energy before casting of at least 1500 kWh per ton of raw materials for a furnace power of at least 150 kW. The fusion conditions may be such that the grains have a maximum carbon content of 1500 ppm.

The base grains may in particular be manufactured according to a method comprising the following successive steps:
a) mixing of raw materials;
b) melting, conventionally in an electric furnace, of said mixed raw materials until a molten liquid is obtained;
c) cooling of said molten liquid by quenching it, preferably so that the molten liquid is entirely solidified in less than 3 minutes, until a solid mass is obtained; and
d) milling of said solid mass so as to obtain fused grains and, optionally, grit size classification of said grains.

In step a), the raw materials are chosen, in a known manner, as a function of the desired composition for the fused grains to be manufactured.

Preferably, the source of zirconia is determined so that the amount of hafnium oxide is less than 5%, preferably less than 2%.

The sources of raw materials are preferably determined so that the total content of impurities of the grains is less than 0.5% and/or so that the content of each of the impurities is less than 0.3%.

Silica and sodium oxide in particular are known for being prejudicial in the fused grains, and their respective contents should be limited to trace amounts in the fused grains, introduced as impurities in the raw materials. Indeed, the presence of silica leads to the formation of a glassy phase which modifies the abrasive properties and the hardness of the grains. The presence of sodium oxide, even at low contents, leads to the formation of beta-alumina. However this crystallographic form of alumina reduces the abrasive properties of the grains. Preferably, $Na_2O<0.1\%$, or even $Na_2O<0.05\%$.

Therefore, the raw materials are preferably chosen so that the contents of $SiO_2$, $CaO$, $TiO_2$, $Fe_2O_3$ or of $Cr_2O_3$ in the grains are each less than 0.5%, preferably less than 0.3%.

In step b), the melting conditions are preferably such that the grains have a maximum carbon content of 1500 ppm, 1300 ppm, or even 800 ppm.

In particular, the melting may be carried out by means of a short arc, with a fusion energy before casting of at least 2000 kWh per ton of raw materials for a furnace power of at least 150 kW.

In step c), the cooling is rapid and may result, for example, by casting between cooled thin plates, as described in U.S. Pat. No. 3,993,119.

Crystallographic analysis of the grains according to the invention thus manufactured did not make it possible to reveal the presence of a spinel phase, except in trace amounts. The grains have a porosity measured by helium pycnometry of less than 3%.

In step d), the grit size of the grains may be selected as a function of the intended application. Preferably, the grains according to the invention have a grit greater than Grit 6 and/or less than Grit 220, less than Grit 80, or less than Grit 24.

The methods for manufacturing the abrasive tools according to the invention are well known.

Bonded abrasive tools may be formed by pressing in the form of a mixture of abrasive grains and a binder.

In one abrasive tool according to the invention, the binder may be vitrified (for example, a binder composed of oxides, essentially silicate-containing binder) or organic. An organic binder is particularly suitable.

The binder may especially be a thermoset resin. It may be chosen from the group formed by the following resins: phenolic, epoxy, acrylate, polyester, polyimide, polybenzimidazole, polyurethane, phenoxy, phenol-furfural, aniline-formaldehyde, urea-formaldehyde, cresol-aldehyde, resorcinol-aldehyde, urea-aldehyde, melamine-formaldehyde, and mixtures thereof.

Usually, the binder represents between 2% and 60%, preferably between 20% and 40% by volume of the mixture.

The binder may also incorporate organic or inorganic fillers, such as hydrated inorganic fillers (for example aluminum trihydrate or boehmite) or non-hydrated inorganic fillers (for example molybdenum oxide), cryolite, a halogen, fluorspar, iron sulfide, zinc sulfide, magnesia, silicon carbide, silicon chloride, potassium chloride, magnesium dichloride, potassium or zinc fluoroborate, potassium fluoroaluminate, calcium oxide, potassium sulfate, a vinylidene chloride/vinyl chloride copolymer, polyvinylidene chloride, polyvinyl chloride, fibers, sulfides, chlorides, sulfates, fluorides and mixtures thereof. The binder may also contain reinforcing fibers such as glass fibers.

EXAMPLES

The following non-limiting examples are given for the purpose of illustrating the invention.

The reference products ("Ref") are fused alumina-zirconia grains, sold under the name ZF® or ZS® and having the following chemical analysis, as percentages by weight: $Al_2O_3$: 75.0%, $ZrO_2$+$HfO_2$: 24.1%, $TiO_2$: 0.1%, $SiO_2$<0.2%, MgO; 0.05%, CaO: 0.07%, others <0.8%. The crystallographic and microstructural analyses reveal that all of the zirconia is combined with alumina in eutectic form; the balance for the alumina is found in the form of alpha-alumina (corundum).

The other products tested were produced from the following raw materials:
- under-calcined Bayer® alumina with a sodium hydroxide content of less than 0.3%;
- zirconia powder with a $ZrO_2$+$HfO_2$ content of greater than 98%; and
- petroleum coke.

Magnesium oxide is provided by pure materials having more than 99% of magnesium MgO.

The products were prepared according to the conventional method well known to a person skilled in the art:

Raw materials were firstly assayed so as to be able to manufacture grains of given composition.

To these raw materials were added a minimum of 1% (up to 3%) of petroleum coke, depending on the state of the furnace, in percentages by weight on the basis of the feedstock.

The feedstock was then melted in a single-phase electric arc furnace of Heroult type with graphite electrodes, using a furnace vessel of 0.8 m in diameter, a voltage of 105 V to 150 V, a current of 1800 to 2500 A and a supplied specific electric power of 2.0 to 2.8 kWh/kg of charge.

The molten liquid was then rapidly cooled using a device for casting between thin metal plates such as that presented in U.S. Pat. No. 3,993,119. The fused grains were then milled and classified according to their grit size.

The grains obtained are characterized chemically by X-ray fluorescence. All of the chemical analysis data is given in Table 1. The content of impurities, excluding carbon, varies between 0.3 and 1%. The balance corresponds to the content of alumina.

To demonstrate the mechanical properties of the grains, the tests described below were carried out.

Test A: Determination of the Impact and Fracture Strength

The purpose of test A was to determine the fraction of surviving grains of a given grit size distribution slice after being stressed in a steel milling jar. This tests enables a dynamic evaluation of the fracture strength and friability of the grains.

Prior to the test, the mixture of grains was firstly screened on a vibrating screen of the ROTAP® type, which is standard in the industry, so as to isolate the 710/850 μm fraction in order to represent number F24 grain (Grit 24).

The grit size distribution fraction isolated then underwent a de-ironing operation, using magnetic separation, so as to extract the metallic iron symptomatic of contamination due to the milling.

A Sodemi rotary mill commonly used for milling powders for chemical analysis thereof was used for the test. This mill was mounted in suspension on 8 springs and a hollow cylindrical jar containing grains to be tested, a pallet and a freely sliding ring were set in motion. The cylindrical milling jar made of steel (Z160 C 12 grade) had the following dimensions: height, 50 mm; inside diameter, 139 mm. The pallet was a solid cylinder (75 mm diameter; 45 mm height) made of steel of Z200C12 grade and weighed 1546 grams. The cylindrical ring (95/120 mm inside/outside diameter; 45 mm height) was made of steel of the same Z200C12 grade and weighed 1464 grams.

Test A on a specimen then comprised the following steps:
1. the jar was cleaned with compressed air;
2. a sample of 25 grams of grit size distribution fraction of the product to be tested was introduced between the wall of the milling jar and the pallet. The Sodemi mill was turned on, rotating at its nominal speed (1400 rpm) for a period of 4 seconds. The milled product was then extracted from the milling jar using a brush (No. 50) in order to analyze the grit size distribution. The product was thus screened in a series of 70 mm diameter screens of a ROTAP® screener for 3 minutes, with the following screens $T_i$:

| | | Screens used (apertures in μm) | |
|---|---|---|---|
| Grit represented | Fraction Tested | T1 | T2 |
| 24 | 710/850 μm | 710 | 425 |

"T1+T2" refers to the sum of the oversizes (fractions that do not pass through the screens), by weight, of the screens T1 and T2. The value of the impact and fracture strength (test A), given as a percentage, corresponds to the value of T1+T2 of the specimen tested divided by the value $T_1+T_2$ of the reference specimen. The impact and fracture strength will therefore be better the higher the value obtained in test A.

Test B: Determination of the Hardness

Test B aims to determine the Vickers hardness by microindentation.

The fused grains having a size between 710 and 850 μm were selected then coated in thermosetting epoxy resin. Subsequent sawing and polishing made it possible to obtain polished grains on which it is possible to measure the Vickers hardness.

The Vickers hardness is determined by indentation with a Zwick 3212 microhardness tester equipped with a Vickers diamond. The hardness measurement test consists in impressing into the abrasive grain an indenter in the shape of a square-based right pyramid having an apex angle of 136° under a load F of 50 grams for 15 seconds and in measuring the mean diagonal d of the imprint left (mean of the two diagonals of the imprint) in the grain after removing the load. The Vickers hardness is proportional to the ratio F/S with S the surface area of the imprint in question as right pyramid. The Vickers hardness corresponds to the mean of 10 measurements taken over 10 imprints indented randomly on the polished grains.

The Vickers hardness (test B), given as a percentage, corresponds to the value $0.189 \times F/d^2$ where $d=(d1+d2)/2$ and $d1$ and $d2$ are the two diagonals of the imprint formed for the sample tested, divided by the value $0.189 \times F/d^2$ of the reference sample. The hardness is therefore better the higher the value obtained in test B.

The grains according to the invention preferably have results greater than 95% in test A and greater than 85% in test B.

TABLE 1

|   | MgO | $ZrO_2$ + $HfO_2$ | ($ZrO_2$ + $HfO_2$)/ MgO | MgO/ $Al_2O_3$ × 10000 | t-$ZrO_2$/ $ZrO_2$ | Test A | Test B |
| --- | --- | --- | --- | --- | --- | --- | --- |
| 1 | 0.56% | 15.9% | 28 | 67 | 48% | 65% | 122% |
| 2 | 1.33% | 16.8% | 13 | 162 | 70% | 62% | 71% |
| 3 | 0.61% | 16.9% | 28 | 75 | 36% | 97% | 100% |
| 4 | 0.68% | 17.0% | 25 | 84 | 44% | 96% | 105% |
| 5 | 0.53% | 17.9% | 34 | 66 | 48% | 109% | 113% |
| 6 | 0.85% | 18.4% | 22 | 106 | 53% | 70% | 108% |
| 7 | 0.49% | 19.1% | 39 | 61 | 66% | 104% | 88% |
| 8 | 0.51% | 19.1% | 37 | 65 | 37% | 105% | 116% |
| 9 | 0.44% | 19.3% | 44 | 56 | 34% | 103% | 109% |
| 10 | 0.40% | 19.9% | 49 | 51 | 37% | 103% | 87% |
| 11 | 0.45% | 20.4% | 45 | 58 | 31% | 107% | 136% |
| 12 | 0.52% | 20.7% | 40 | 67 | 46% | 102% | 132% |
| 13 | 0.48% | 21.1% | 44 | 62 | 30% | 109% | 98% |
| 14 | 0.57% | 21.3% | 37 | 74 | 61% | 98% | 142% |
| 15 | 0.31% | 21.6% | 70 | 40 | 44% | 83% | 66% |
| 16 | 0.42% | 22.3% | 53 | 55 | 30% | 110% | 116% |
| 17 | 2.11% | 23.5% | 11 | 286 | 90% | 72% | 62% |
| Ref | 0.05% | 25.0% | 500 | 0.7 | 30% | 100% | 100% |

Examples 2, 6, 15 and 17 show that a ($ZrO_2$+$HfO_2$)/MgO weight ratio between 25 and 65 is necessary in order to obtain good results in test A. Example 1 shows however that this condition is insufficient to obtain good results in test A when the amount of zirconia is too low.

Examples 5, 11, 13 and 16 are preferred above all when maximum performances in test A are desired.

Examples 5, 8, 11, 12 and 14 are preferred above all when maximum performances in test B are desired. The performances of Examples 11, 12 and 14 are particularly noteworthy.

Example 11 exhibits the best compromise, for the targeted applications, between impact strength and hardness. Example 12 also provides an excellent compromise.

Example 5 is also very advantageous since it exhibits excellent performances with a low zirconia content, and therefore with a reduced manufacturing cost. For the same reason, Example 3, which exhibits performances substantially identical to those of the reference example, constitutes an advantageous alternative thereto.

Analysis by X-ray diffraction and by microprobe reveals that, for the grains of the invention, the majority of the magnesium is found in the alumina-zirconia eutectic phase; the balance of alumina is found in the form of alpha-alumina (corundum); no spinel phase (solid solution of alumina and of magnesium oxide) is found or else only in the form of traces, unlike in Examples 2 and 17 where a spinel phase is found. For the grains of the invention, a proportion of zirconia stabilized in tetragonal form (t-$ZrO_2$) of the order of 30% to 70% relative to the zirconia is found.

As is now clearly apparent, the grains of the invention make it possible to obtain properties that are equivalent to or that are improved relative to those of the grains according to the prior art, with a lower zirconia content, and therefore a lower manufacturing cost.

Of course, the present invention is not limited to the embodiments provided as illustrative examples.

The invention claimed:

1. Fused grains having the following chemical analysis, as percentages by weight on the basis of the oxides:
   $Al_2O_3$: balance to 100%;
   $ZrO_2$+$HfO_2$: 16-24%;
   MgO in an amount ranging from greater than 0.35% to less than 0.80%;
      wherein a ($ZrO_2$+$HfO_2$)/MgO weight ratio is 25 or more to less than 49;
   a proportion of zirconia stabilized in tetragonal form represents at least 30% to less than 66% of the total amount of zirconia; and
   other species: 0-2%.

2. The fused grains as claimed in claim 1, in which the ($ZrO_2$+$HfO_2$)/MgO weight ratio is greater than 28.

3. The fused grains as claimed in claim 2, in which the ($ZrO_2$+$HfO_2$)/MgO weight ratio is greater than 30.

4. The fused grains as claimed in claim 1, in which ($ZrO_2$+$HfO_2$)<22.5%, as a percentage by weight on the basis of the oxides.

5. The fused grains as claimed in claim 4, in which ($ZrO_2$+$HfO_2$)<20.0%, as a percentage by weight on the basis of the oxides.

6. The fused grains as claimed in claim 1, in which 17.0%< ($ZrO_2$+$HfO_2$), as a percentage by weight on the basis of the oxides.

7. The fused grains as claimed in claim 1, having a size of greater than 150 μm and less than 3.35 mm.

8. An abrasive tool comprising grains bound by a binder, bonded to or deposited on a support, at least one portion of said grains being in accordance with claim 1.

9. An abrasive medium, comprising the grains of claim 1.

10. The fused grains as claimed in claim 1, wherein the ($ZrO_2$+$HfO_2$)/MgO weight ratio ranges from 25 or more to less than 47.

* * * * *